(12) United States Patent
Zuckerwar et al.

(10) Patent No.: US 8,671,763 B2
(45) Date of Patent: Mar. 18, 2014

(54) SUB-SURFACE WINDSCREEN FOR OUTDOOR MEASUREMENT OF INFRASOUND

(75) Inventors: Allan J. Zuckerwar, Williamsburg, VA (US); Qamar A. Shams, Yorktown, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 197 days.

(21) Appl. No.: 12/850,708

(22) Filed: Aug. 5, 2010

(65) Prior Publication Data

US 2011/0132095 A1    Jun. 9, 2011

Related U.S. Application Data

(60) Provisional application No. 61/255,304, filed on Oct. 27, 2009.

(51) Int. Cl.
*G01H 11/06* (2006.01)

(52) U.S. Cl.
USPC ............................................. 73/649; 73/658

(58) Field of Classification Search
USPC .................. 73/649, 658; 181/122, 158, 175; 381/71, 189, 354, 359
See application file for complete search history.

(56) References Cited

U.S. PATENT DOCUMENTS

| | | | |
|---|---|---|---|
| 3,550,720 A * | 12/1970 | Ballard et al. | 181/175 |
| 4,281,222 A | 7/1981 | Nakagawa et al. | |
| 4,625,827 A * | 12/1986 | Bartlett | 181/158 |
| 4,712,429 A * | 12/1987 | Raspet et al. | 73/646 |
| 5,195,843 A * | 3/1993 | George et al. | 405/63 |
| 5,226,076 A | 7/1993 | Baumhauer, Jr. et al. | |
| 5,349,140 A * | 9/1994 | Valenzin | 181/158 |
| 5,511,130 A | 4/1996 | Bartlett et al. | |
| 5,684,324 A | 11/1997 | Bernstein | |
| 5,790,679 A | 8/1998 | Hawker et al. | |
| 6,091,829 A * | 7/2000 | Blackmer et al. | 381/356 |
| 6,108,415 A | 8/2000 | Andrea | |
| 6,284,360 B1 * | 9/2001 | Johnson et al. | 428/317.7 |
| 6,570,500 B1 | 5/2003 | Pieper | |
| 6,626,822 B1 | 9/2003 | Jaeger et al. | |
| 6,788,417 B1 * | 9/2004 | Zumberge et al. | 356/477 |
| 6,831,987 B2 | 12/2004 | Killion et al. | |
| 6,975,736 B2 | 12/2005 | Hasegawa | |
| 7,065,224 B2 | 6/2006 | Cornelius et al. | |

(Continued)

OTHER PUBLICATIONS

Measurement of Infrasound Generated by Wind Turbine generator, SICE Annual Conference 2008, Sugimoto et al.*

(Continued)

*Primary Examiner* — J M Saint Surin
(74) *Attorney, Agent, or Firm* — Robin W. Edwards; Helen M. Galus

(57) ABSTRACT

A windscreen is configured for measuring outdoor infrasonic sound. The windscreen includes a container and a microphone. The container defines a chamber. The microphone is disposed in the chamber and can be operatively supported by the floor. The microphone is configured for detecting infrasonic sound. The container is advantageously formed from material that exhibits an acoustic impedance of between 0 and approximately 3150 times the acoustic impedance of air. A reflector plate may be disposed in the container. The reflector plate operatively can support the microphone and provides a doubling effect of infrasonic pressure at the microphone.

21 Claims, 4 Drawing Sheets

(56) References Cited

U.S. PATENT DOCUMENTS

| | | | |
|---|---|---|---|
| 7,110,553 B1 | 9/2006 | Julstrom et al. | |
| 7,255,196 B1* | 8/2007 | Coney et al. | 181/122 |
| 7,269,537 B1* | 9/2007 | Mattern | 702/190 |
| 2003/0055359 A1 | 3/2003 | Halleck et al. | |
| 2005/0025328 A1 | 2/2005 | Song | |
| 2007/0003092 A1 | 1/2007 | Shen | |
| 2007/0053538 A1 | 3/2007 | Jensen | |

OTHER PUBLICATIONS

NASA Langley Research Center, Hampton, VA, Sep. 1, 2005, "Compact Infrasonic Windscreen—High Values of Infrasound-Transmission and Wind-Noise-Attenuation Coefficients Can be realized".

Qamar A. Shams, et al., "Compact Nonporous Windscreen for Infrasonic Measurements", Journal of Acoustic Society AM, 118(3) Pt. 1, Sep. 2005, pp. 1335-1340.

Allan J. Zuckervvar, Qamar A. Shams, Krish K. Ahuja and Robert Funk, Presentation, "Soaker Hose vs. Compact Non-Porous Windscreen: A Comparison of Performance at Infrasonic Frequencies", 150th Meeting of the Acoustical Society of America, Oct. 2005.

Qamar A. Shams, Allan J. Zuckerwar, Scott B. Sealey, Presentation, "Compact Non-Porous Cylindrical vs. Spherical Windscreens: Performance at Infrasonic Frequencies", 150th Meeting of the Acoustical Society of America, Oct. 16, 2005.

Qamar A. Shams, B. Scott Sealey, Toby Comeaux, Allan J. Zuckerwar and Laura M. Bott, Presentation, "Infrasonic Windscreen", 146th Meeting of the Acoustical Society of America, Nov. 11, 2003.

* cited by examiner

SUB-SURFACE WINDSCREEN FOR OUTDOOR MEASUREMENT OF INFRASOUND

CROSS-REFERENCE TO RELATED APPLICATIONS

This application claims the benefit of U.S. Provisional Application No. 61/255,304, filed Oct. 27, 2009, and which is hereby incorporated by reference in its entirety.

ORIGIN OF THE INVENTION

This invention was made in part by an employee of the United States Government and may be manufactured and used by or for the Government of the United States of America for governmental purposes without the payment of any royalties thereon or therefor.

TECHNICAL FIELD

The present invention relates to a windscreen for measurement of infrasound.

BACKGROUND OF THE INVENTION

Above ground, infrasound activity is measured. Infrasound is defined as sound at frequencies below 20 Hz. However, in order to determine the infrasound levels, wind noise typically needs to be filtered out. Instruments which filter out the wind noise typically use a microphone that is connected to a long "soaker hose." The infrasound levels are determined after averaging out the wind noise with the soaker hose. However, the soaker hose is deemed ineffective with wind speeds above 2.5 meters per second.

SUMMARY OF THE INVENTION

A windscreen is configured for measuring infrasonic sound. The windscreen includes a container, a microphone, and a reflection plate. The container defines a chamber. The microphone is disposed in the chamber and is configured for detecting infrasonic sound. The reflection plate is disposed in the container and operatively supports the microphone. The container is formed from material that exhibits a specific acoustic impedance of between 0 and approximately 3150 times the specific acoustic impedance of air.

A windscreen is configured for measuring infrasonic sound. The windscreen includes a container and a microphone. The container defines a chamber. The microphone is disposed in the chamber and is configured for detecting infrasonic sound. The container is formed from material that exhibits a specific acoustic impedance of between 0 and approximately 3150 times the specific acoustic impedance of air. The container is disposed in the Earth's ground surface such that a top of the container is generally flush with the surface of the ground.

An array is configured for determining the direction of infrasonic sound. The array includes a plurality of windscreens. The windscreens are configured for measuring infrasonic sound. Each windscreen includes a container and a microphone. The container defines a chamber. The microphone is disposed in the chamber and is configured for detecting infrasonic sound. The container is formed from material that exhibits a specific acoustic impedance of between 0 and 3150 times the specific acoustic impedance of air. Each of the windscreens is disposed in spaced relationship to one another.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
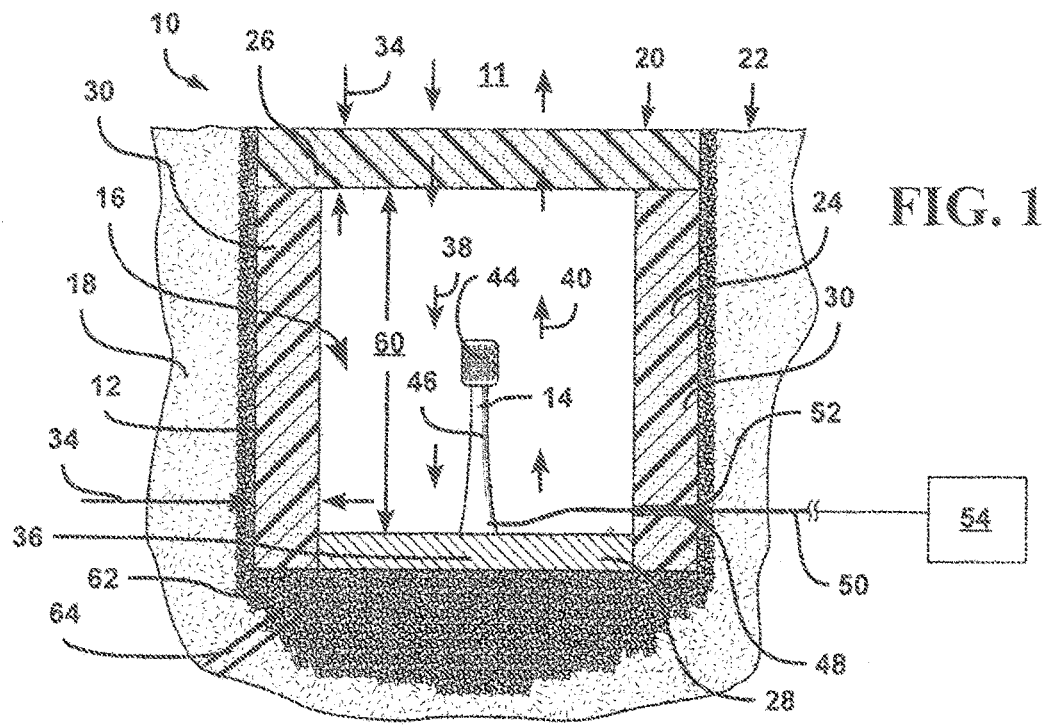
FIG. 1 is a schematic cross-sectional side view of a windscreen having a reflection plate supporting a microphone.

Referring to the drawings, wherein like reference numbers correspond to like or similar components throughout the several figures, FIG. 1 shows a windscreen 10 configured for measuring infrasonic sound in the form of infrasonic pressure. The windscreen 10 includes a container 12 and a microphone 14. The container 12 defines a chamber 16. The microphone 14 is disposed in the chamber 16 and is configured for detecting infrasonic sound. The container 12 may be operatively disposed in the Earth's ground surface 18 such that a top 20 of the container 12 is generally flush with the surface 22 of the ground. Positioning the top 20 of the container 12 flush with the surface 22 of the ground takes advantage of the fact that the horizontal wind speed approaches zero near the Earth's ground surface 18. This means that sound associated with the wind is effectively eliminated at the Earth's ground surface 18.

Referring to the embodiments shown in FIGS. 1-4, the container 12 includes a box 24 and a lid 26 configured to be removably disposed on the box 24. The lid 26 is tightly fitted to the box 24 to seal therebetween. The container 12 is formed from a material that is generally impervious to moisture. The box 24 and the lid 26 are formed from the same type of material in order to ensure that the lid 26 remains tightly fitted to the box 24 as the material expands and/or contracts when exposed to varying temperatures. The container 12 is advantageously formed from material that exhibits an acoustic impedance of between 0 and 3150 times the specific acoustic impedance of air. Specific acoustic impedance may be defined as the ratio of acoustic pressure to acoustic particle velocity. The material may be foam, such as closed-cell polyurethane foam. The closed-cell polyurethane foam may be an "eight-pounder," as known to those skilled in the art. The closed-cell polyurethane foam provides a specific acoustic impedance of approximately 222 times the specific acoustic impedance of air. The closed-cell polyurethane foam provides a container 12 that is impervious to moisture penetration. Additionally, the closed-cell structure of the foam blocks convective pressure fluctuations caused by atmospheric turbulence. This means that the windscreen 10 passes infrasonic waves with nearly 100% transmission coefficient over the entire infrasonic frequency range (i.e., 0 to 20 Hertz). Alternatively, the material may be wood, such as balsa or cedar. Balsa provides a specific acoustic impedance of approximately 323 times that of the specific acoustic impedance of air. Cedar provides a specific acoustic impedance of approximately 3150 times the specific acoustic impedance of air. As yet another alternative, the material may be a fibrous ceramic material, such as space shuttle tile material. The space shuttle tile material provides a specific acoustic impedance of approximately 332 times that of the specific acoustic impedance of air. Additionally, the wall 30, the floor 28, and/or the lid 26 may have a thickness 34 of approximately 0.5 inches to ensure sufficient structural stability of the windscreen 10. Other materials may also be used, so long as they also have low specific acoustic impedance and are moisture impervious.

Figure 2:
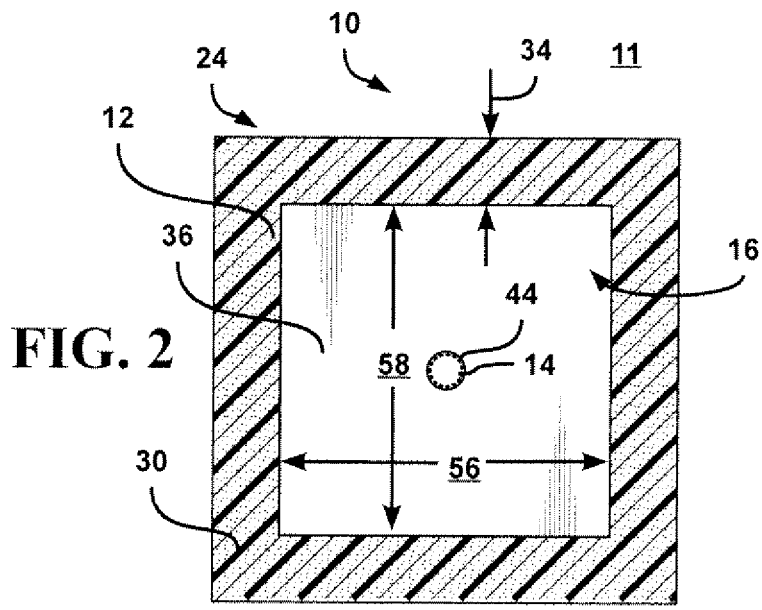
FIG. 2 is a schematic cross-sectional plan view of a windscreen of FIG. 1 having four walls.

Referring to FIG. 1, the box has at least one wall 30. The container 12 includes a reflection plate 36 that operatively supports the microphone 14. More specifically, as shown, the reflection plate 36 is a floor 28 and the box 24 includes at least one wall 30. Referring to FIG. 2, the wall 30 extends in generally perpendicular relationship to the reflection plate 36 to support the microphone 14. Referring specifically to FIGS. 1 and 2, the box 24 includes four walls 30 that extend in perpendicular relationship to the reflection plate 36 to define the chamber 16.

Figure 4:
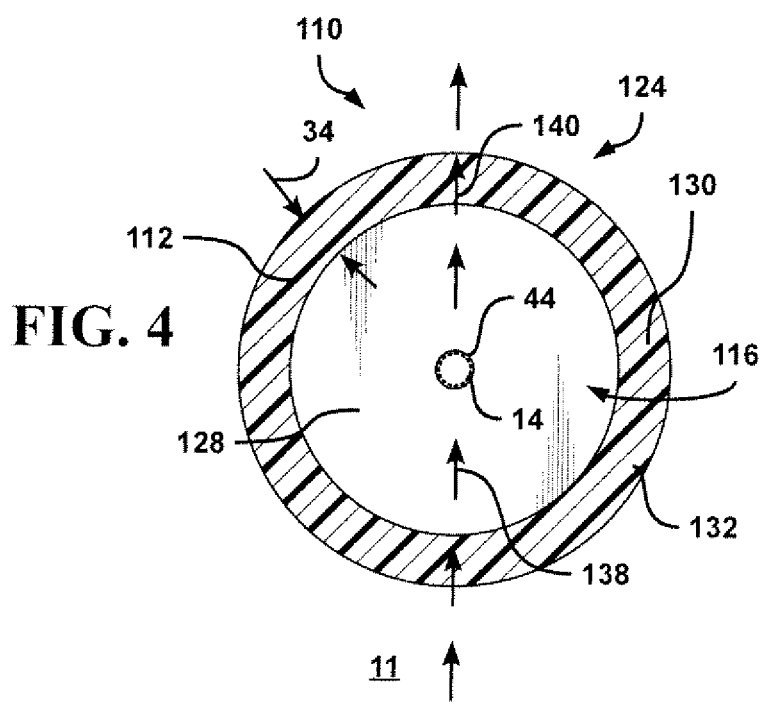
FIG. 4 is a schematic cross-sectional plan view of the cylindrical windscreen of FIG. 3.
Figure 3:
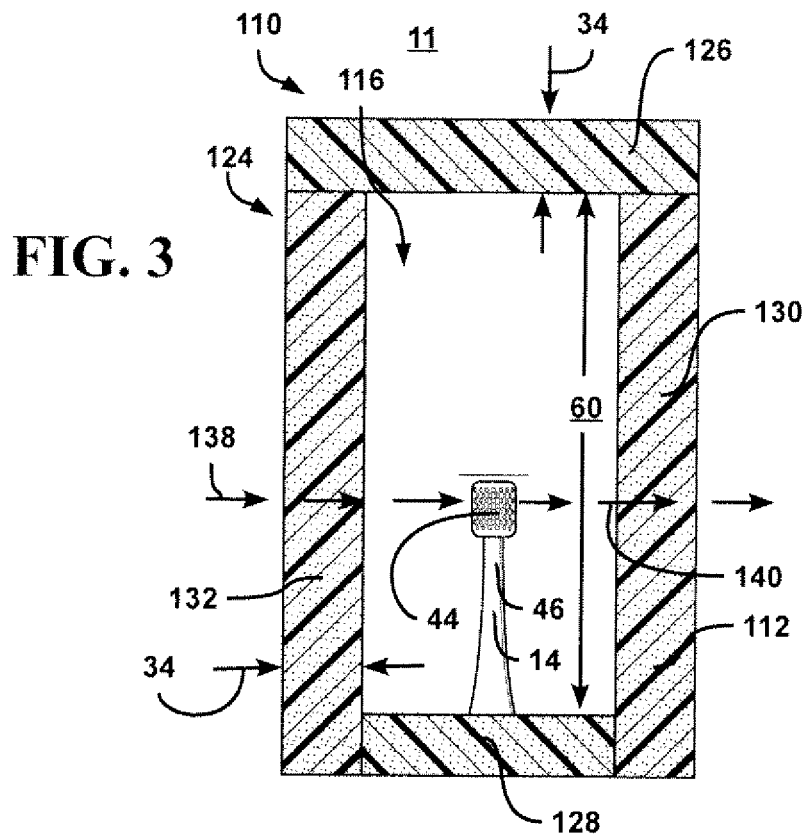
FIG. 3 is a schematic cross-sectional side view of a cylindrical windscreen.

Alternatively, referring to the embodiment in FIGS. 3 and 4, windscreen 110 has a box 124 that includes a single, continuous cylindrical wall 130 that forms a tube 132. The wall 30 extends from a floor 128 to define the chamber 116. Therefore, the wall(s) 130 and the floor 128 cooperate to define the chamber 116 that houses the microphone 14. The lid 126 is configured to be removably disposed on the wall(s) 130 to enclose the microphone 14 in the box 124. It should be appreciated that containers 12, 112 have a different number of walls 30, 130 and/or different shapes may also be used.

Figure 5:
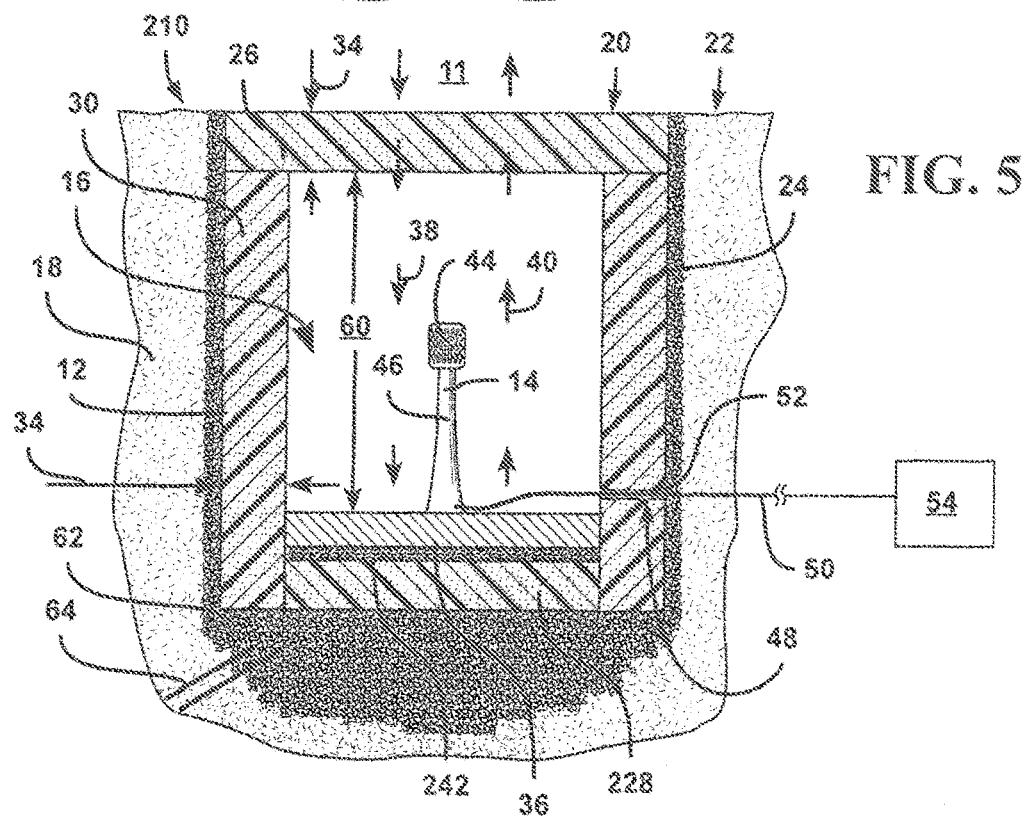
FIG. 5 is a schematic cross-sectional side view of another embodiment of a windscreen having a floor, a vibration damping layer, and the reflection plate.

The reflection plate 36 is formed from a material having high acoustic impedance, such as steel. In the embodiment shown in FIGS. 1, 2, and 5, the reflection plate 36 is generally planar and supports the microphone 14. During operation, infrasonic sound waves propagating through ambient air 11 are incident upon the lid 26, as illustrated in FIGS. 1 and 5. The incident waves 38 pass through the lid 26 and are reflected by the reflection plate 36. The reflected waves 40 pass back through the lid 26 into the ambient air 11. The incident waves 38 and the reflected waves 40 reinforce each other at the microphone 14 to provide a doubling effect of the infrasonic pressure at the microphone 14. Accordingly, the reflection plate 36 provides a 6 dB gain to the windscreen 10. Incident waves 38 having frequencies beyond the infrasonic region, however, are highly attenuated.

Referring again to the embodiment shown in FIG. 5, the windscreen 210 also includes a vibration damping layer 242 disposed between a floor 228 of the box 24 and the reflection plate 36. In this embodiment, the reflection plate 36 is supported by the vibration damping layer 242 that is, in turn, supported by the floor 228 of the box 24. The vibration damper layer is configured to prevent seismic signals from reaching the microphone 14. A typical vibration damping layer 242 is formed from polystyrene foam.

Referring again to FIGS. 1, 3, and 5, the microphone 14 includes a sensing element 44 that extends from a post 46. The sensing element 44 may be a stretched membrane or plate. However, other sensing elements 44, known to those skilled in the art, may also be used. The post 46 is supported by the reflection plate 36. Additionally, the post 46 may be secured to the reflection plate 36, as illustrated in FIGS. 1 and 5, or to the floor, as illustrated in FIG. 3, in order to prevent the microphone 14 from moving relative to the reflection plate 36. The microphone 14 may include a low-frequency adapter. As shown, the container 12 defines an access hole 48 and a cable 50 operatively extends from the microphone 14, through the access hole 48. A seal 52 is formed between the cable 50 and the access hole 48 such that propagations in air are prevented from entering the chamber 16 through the access hole 48. The cable 50 extends to a supporting electronics and data acquisition system exterior to the windscreen 10, designated as 54 in FIGS. 1 and 5. The supporting electronics can include a power supply to the microphone 14.

Figure 7:
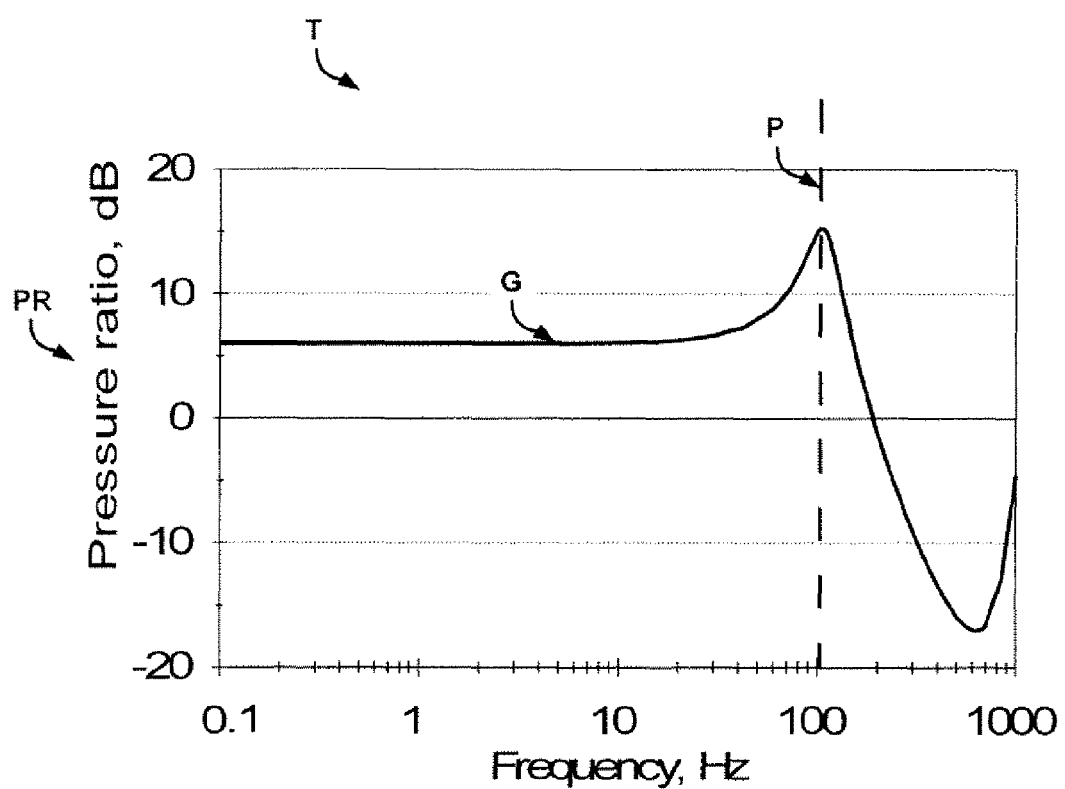
FIG. 7 is a graphical illustration of a transfer function representing a ratio of acoustic pressure at a sensing element to an incident acoustic pressure on a lid of the windscreen.

Referring generally to FIGS. 1 and 2, the box 24 may have an interior cross section having a length 56 and width 58 measuring approximately 12 inches long by 12 inches wide and having a cavity depth 60 of approximately 14 inches. Other dimensions may be suitable, as long as the sensing element 44 of the microphone 14 is situated approximately at the center of the cavity of the container 12. Referring to FIG. 7, a typical transfer function T, defined as the ratio of acoustic pressure at the sensing element 44 of the microphone 14 to the incident acoustic pressure on the lid 26 of the container 12, provides the pass band to extend well into the audio frequency region with a 6 dB gain, designated as G, with a peak, designated as P, in the response at approximately 100 Hz that plummets rapidly at higher frequencies. This peak P may be filtered out electronically, if desired.

Referring again to FIGS. 1 and 5, the container 12 may be surrounded by drainage rocks 62, or other drainage material, when disposed inside the ground surface. Additionally, a drainage pipe 64 may be disposed within the ground surface such that water flowing down, around the container 12, and through the drainage material is directed away.

Alternatively, referring to FIGS. 3 and 4, the windscreen 110 includes a container 112 that may be placed above the Earth's ground surface. In this embodiment, the container 112 can be tubular in shape. During operation, incoming transmitted infrasonic sound waves 138 propagating through ambient air 11 pass horizontally through the wall 130 of the box 124. Outgoing waves 140 pass horizontally back through the wall 130 into the ambient air 11.

Figure 6:
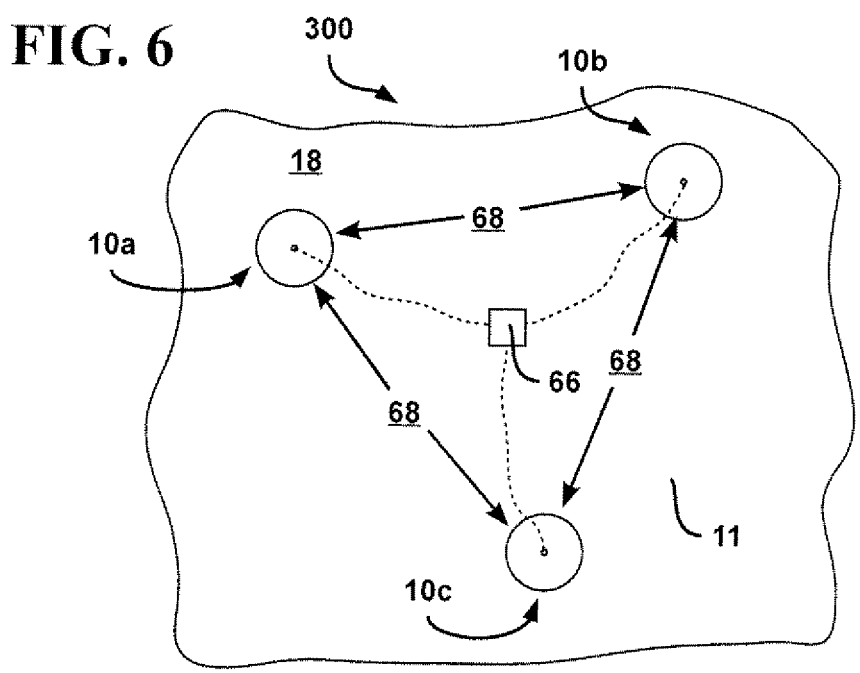
FIG. 6 is a schematic illustration of an array of three windscreens disposed in spaced relationship to one another.

Referring to FIG. 6, an array 300 may be provided in order to determine direction of a source of the infrasonic sound signals. The array includes a plurality of windscreens 10a, 10b, 10c. The windscreens 10a, 10b, 10c are each configured for measuring infrasonic sound. Each of the windscreens 10a, 10b, 10c is disposed in spaced relationship to one another and is operatively interconnected by a control station 66. In one embodiment, there are at least three windscreens 10. However, more or fewer windscreens 10a, 10b, 10c may also be used. In one embodiment, three windscreens 10a, 10b, 10c are equally spaced a distance 68 of approximately 100 feet apart to form an equilateral triangle. The infrasonic pressure measured at each of the windscreen 10a, 10b, 10c can be used to determine a direction of the source of the infrasonic sound. Time delays between infrasonic sound signals received at each microphone 14 within each of the respective windscreens 10a, 10b, 10c permit the determination of the bearing and the elevation of the source of the infrasonic sound signals.

While the best modes for carrying out the invention have been described in detail, those familiar with the art to which this invention relates will recognize various alternative designs and embodiments for practicing the invention within the scope of the appended claims.

What is claimed as new and desired to be secured by Letters Patent of the United States is:

1. A windscreen configured for measuring infrasonic sound, the windscreen comprising:
   a container defining a chamber comprising:
      at least one vertical extending wall; and
      a horizontal floor configured to operatively support a microphone that is disposed in the chamber and configured to detect infrasonic sound;
   wherein the floor comprises a reflection plate configured to receive waves travelling downward in a direction perpendicular to the reflection plate and to reflect the waves as reflected waves that travel perpendicular to the reflection plate in an upward direction, such that the waves and reflection waves reinforce each other at the microphone to provide a doubling effect of infrasonic pressure at the microphone; and
   wherein the container is formed from material exhibiting an acoustic impedance of between 0 and approximately 3150 times the acoustic impedance of air.

2. A windscreen, as set forth in claim 1, wherein the reflection plate is formed from steel.

3. A windscreen, as set forth in claim 1, wherein the container further includes:
   a lid configured to be removably disposed on the at least one wall;
   wherein the lid covers the chamber and forms a seal between the at least one wall and the lid when the lid is disposed on the at least one wall.

4. A windscreen, as set forth in claim 3, wherein the at least one wall is four walls.

5. A windscreen, as set forth in claim 3, wherein the at least one wall is cylindrical such that the wall forms a tube.

6. A windscreen, as set forth in claim 3, wherein the at least one wall and the lid have a thickness of up to approximately 0.5 inches.

7. A windscreen, as set forth in claim 3, wherein the box further includes:
   a floor extending in perpendicular relation to the floor at least one wall; and
   a vibration damping layer disposed between the floor and the reflector plate;
   wherein the vibration damping layer is configured to prevent seismic signals from reaching the microphone.

8. A windscreen, as set forth in claim 7, wherein the vibration damping layer is formed from polystyrene foam.

9. A windscreen, as set forth in claim 3, wherein the reflection plate is positioned to be parallel with respect to the lid and perpendicular with respect to the at least one wall.

10. A windscreen, as set forth in claim 1, wherein the material is impervious to moisture.

11. A windscreen, as set forth in claim 1, wherein the container is disposed in the Earth's ground surface such that a top of the container is generally flush with the surface of the ground.

12. An array configured for determining a direction of infrasonic sound, the array comprising:
   a plurality of windscreens configured for measuring infrasonic sound, each windscreen including;
   a container defining a chamber,
   a reflection plate disposed in the container and configured to receive waves and in response provide reflection waves;
   a microphone disposed in the chamber and configured to detecting infrasonic sound, wherein the placement of the microphone with respect to the reflection plate is configured to cause the waves and reflection waves to reinforce each other at the microphone to provide a doubling effect of infrasonic pressure at the microphone, and;
   wherein the container is formed from material exhibiting an acoustic impedance of between 0 and approximately 3150 times the acoustic impedance of air;
   wherein the plurality of windscreens are disposed in spaced relationship to one another.

13. An array, as set forth in claim 12, wherein the container comprises:
   at least one wall; and
   a lid configured to be removably disposed on the at least one wall, wherein the lid covers the chamber and forms a seal between the at least one wall and the lid when the lid is disposed on the at least one wall.

14. An array, as set forth in claim 13, wherein the reflection plate is positioned to be parallel with respect to the lid and perpendicular with respect to the at least one wall.

15. A windscreen configured for measuring infrasonic sound, the windscreen comprising:
   a container defining a chamber; and
   a microphone disposed in the chamber and configured for detecting infrasonic sound;
   wherein the container is formed from material exhibiting an acoustic impedance of between 0 and approximately 3150 times the acoustic impedance of air;
   wherein the container is disposed in the Earth's ground surface such that a top of the container is generally flush with the surface of the ground.

16. A windscreen, as set forth in claim 15, wherein the container includes:
   a box having reflection plate operatively supporting the microphone, and
   at least one wall extending in generally perpendicular relationship to the reflection plate to surround the microphone,
   wherein the at least one wall and the reflection plate cooperate to define the chamber, and a lid configured to be removably disposed on the at least one wall;
   wherein the lid covers the chamber and forms a seal between the at least one wall and the lid when the lid is disposed on the at least one wall.

17. An array configured for determining a direction of infrasonic sound, the array comprising:
   a plurality of windscreens configured for measuring infrasonic sound, each windscreen including;
   a container defining a chamber, and
   a microphone disposed in the chamber and configured for detecting infrasonic sound, wherein the container is formed from material exhibiting an acoustic impedance of between 0 and approximately 3150 times the acoustic impedance of air;
   wherein the container is disposed in the Earth's ground surface such that a top of the container is generally flush with the surface of the ground; and
   wherein the plurality of windscreens are disposed in spaced relationship to one another.

18. An array, as set forth in claim 17, wherein the container comprises:
   at least one wall; and
   a lid configured to be removably disposed on the at least one wall, wherein the lid covers the chamber and forms a seal between the at least one wall and the lid when the lid is disposed on the at least one wall.

19. An array, as set forth in claim 17, wherein the plurality of windscreens is at least three windscreens.

20. An array, as set forth in claim 12, wherein the container is disposed in the Earth's ground surface such that a top of the container is generally flush with the surface of the ground.

21. An array, as set forth in claim 12, wherein the plurality of windscreens is at least three windscreens.

* * * * *